(12) United States Patent
Farquharson et al.

(10) Patent No.: US 7,971,068 B2
(45) Date of Patent: Jun. 28, 2011

(54) METHOD, SYSTEM AND PROGRAM PRODUCT FOR PROTECTING ELECTRONIC CONTRACTS CREATED WITHIN A SECURE COMPUTER INFRASTRUCTURE

(75) Inventors: Aston G. Farquharson, Carmel, NY (US); Robert T. Alexander, Dallas, TX (US); Michael J. Cammarota, New Fairfield, CT (US); Thao N. Nguyen, Katonah, NY (US); Michael A. Penn, Grandview, NY (US)

(73) Assignee: International Business Machines Corporation, Armonk, NY (US)

( * ) Notice: Subject to any disclaimer, the term of this patent is extended or adjusted under 35 U.S.C. 154(b) by 1228 days.

(21) Appl. No.: 10/834,620

(22) Filed: Apr. 29, 2004

(65) Prior Publication Data

US 2005/0246294 A1    Nov. 3, 2005

(51) Int. Cl.
*G06F 12/14* (2006.01)
(52) U.S. Cl. ....................................................... 713/189
(58) Field of Classification Search .................. 713/189
See application file for complete search history.

(56) References Cited

U.S. PATENT DOCUMENTS

| 5,748,738 A | 5/1998 | Bisbee et al. |
| 5,960,086 A | 9/1999 | Atalla |
| 6,067,531 A | 5/2000 | Hoyt et al. |

(Continued)

FOREIGN PATENT DOCUMENTS

DE    19614789 C1    9/1997

(Continued)

OTHER PUBLICATIONS

JPO Office Action, "Information Materials for IDS", JPO Office Action Dated Sep. 18, 2007.

(Continued)

*Primary Examiner* — Nasser Moazzami
*Assistant Examiner* — Michael S McNally
(74) *Attorney, Agent, or Firm* — William Schiesser; Hoffman Warnick LLC

(57) ABSTRACT

Under the present invention, contract information corresponding to a first contract between a first contract partner and a customer, and contract information corresponding to a second contract between a second contract partner and the customer is received within a secure computer infrastructure. Based on the contract information, the first and second contracts are created. To provide desired isolation and security, the second contract is secured to prevent access thereof by the first contract partner. Then, approval and execution for both contracts is requested from the appropriate parties.

38 Claims, 9 Drawing Sheets

U.S. PATENT DOCUMENTS

| | | | |
|---|---|---|---|
| 6,141,653 | A | 10/2000 | Conklin et al. |
| 6,167,383 | A | 12/2000 | Henson |
| 6,336,105 | B1 | 1/2002 | Conklin et al. |
| 6,338,050 | B1 | 1/2002 | Conklin et al. |
| 7,051,364 | B1 * | 5/2006 | Tackman et al. ............... 726/3 |
| 7,069,234 | B1 | 6/2006 | Cornelius et al. |
| 7,343,208 | B2 | 3/2008 | Hoefler et al. |
| 7,548,884 | B1 * | 6/2009 | Thomas ........................ 705/38 |
| 2002/0032615 | A1 * | 3/2002 | Ikeda ............................ 705/26 |
| 2002/0062322 | A1 * | 5/2002 | Genghini et al. ............ 707/500 |
| 2002/0138731 | A1 | 9/2002 | Collamore et al. |
| 2002/0150241 | A1 | 10/2002 | Scheidt et al. |
| 2002/0174023 | A1 * | 11/2002 | Grey et al. ..................... 705/26 |
| 2003/0023507 | A1 | 1/2003 | Jankelewitz |
| 2003/0023527 | A1 * | 1/2003 | Wilce et al. ................... 705/35 |
| 2003/0105966 | A1 * | 6/2003 | Pu et al. ........................ 713/186 |
| 2003/0115129 | A1 * | 6/2003 | Feaver et al. ................. 705/37 |
| 2004/0044539 | A1 * | 3/2004 | Taricco et al. ................. 705/1 |
| 2004/0187152 | A1 | 9/2004 | Francis et al. |
| 2005/0043979 | A1 | 2/2005 | Soares et al. |

FOREIGN PATENT DOCUMENTS

| | | |
|---|---|---|
| JP | 2001-357322 | 12/2001 |
| JP | 2002-099843 | 4/2002 |
| JP | 2003-108725 | 4/2003 |
| JP | 2003-296192 | 10/2003 |
| WO | 03021405 A2 | 3/2003 |

OTHER PUBLICATIONS

Office Action, U.S. Appl. No. 10/761,551, Dated Jul. 2, 2007, 13 pages.

Notice of Allowance, U.S. Appl. No. 10/761,551, Dated Oct. 17, 2007, 7 pages.

Notice of Allowance, U.S. Appl. No. 10/761,551, Dated Feb. 20, 2008, 10 pages.

Office Action, U.S. Appl. No. 11/141,281, Dated Mar. 26, 2009, 12 pages.

Final Office Action, U.S. Appl. No. 11/141,281, Dated Sep. 8, 2009, 14 pages.

Notice of Allowance, U.S. Appl. No. 11/141,281, Dated Dec. 3, 2009, 16 pages.

Notice of Allowance, U.S. Appl. No. 11/141,281, Dated Mar. 12, 2010, 10 pages.

* cited by examiner

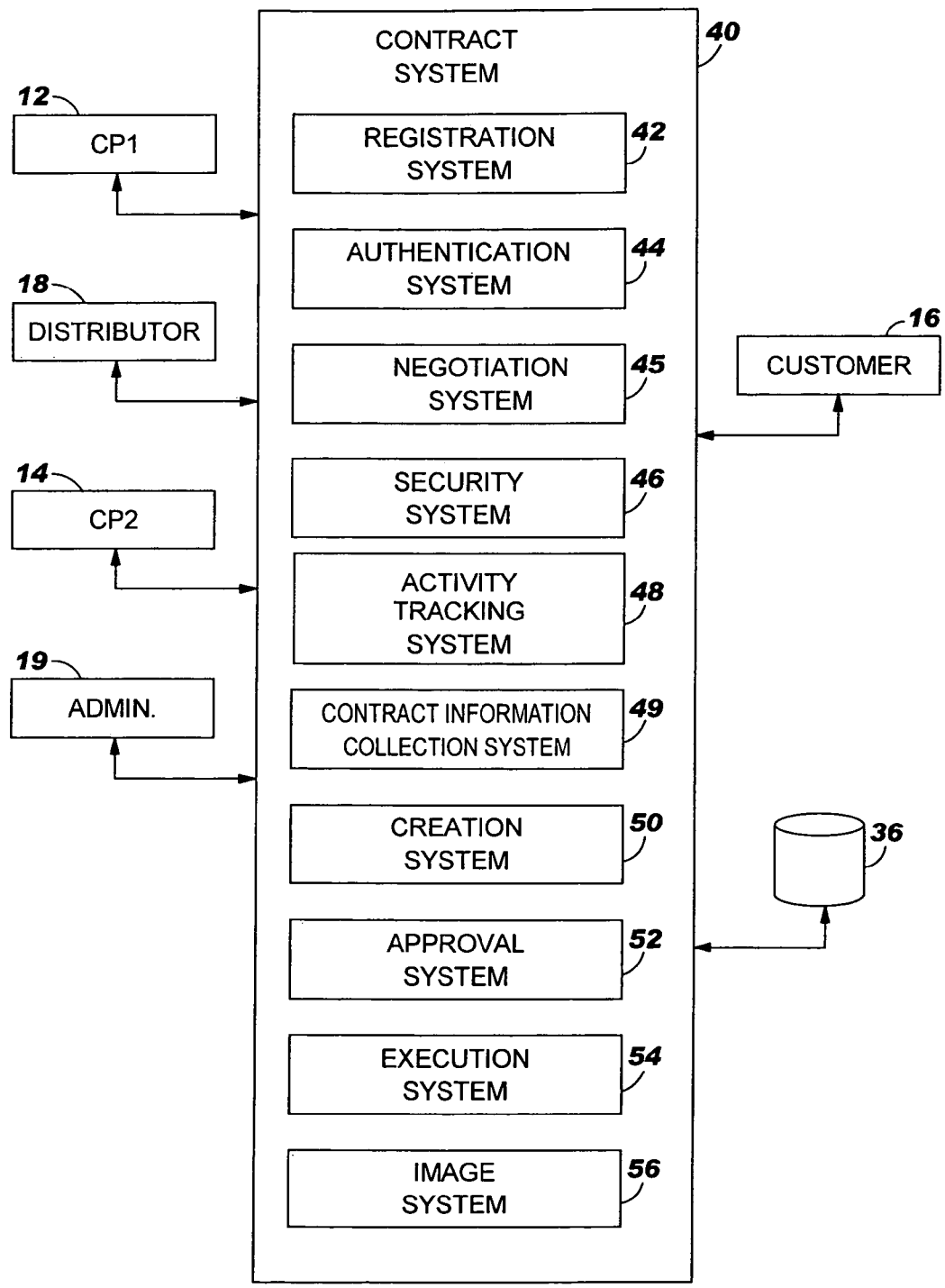

FIG. 5

IBM | Home | Products & services | Support & downloads | My Account

Contracts OnLine

*User Id: thao*
*Org Name: International Business Machine*

- Contracts in Process
- All Contracts In Process
- Create Contract
- Search
- Contracts OnLine Home
- Log Off

Create/Update Contract

The fields indicated with an asterisk (*) are required to complete this transaction; other fields are optional.

| Field | Value |
|---|---|
| Transaction description * | Term Lease Supplement for I-Series Servers for ABC Project |
| Contract No. * | C12345808 |
| Master Contract No. | NAD090 |
| RFP/RFQ No. | R222450 |
| Quote No. | Q12345V2 |
| PO No. | |
| Customer Reference | |
| Contract comments | Please note: this TL supplement must be processed by 10/30/2003 to meet the ABC project deadline |
| Valid Through * | 2003-10-30  Enter Date in YYYY-MM-DD format |
| Start Date | 2003-11-10  Enter Date in YYYY-MM-DD format |
| End Date | 2004-11-10  Enter Date in YYYY-MM-DD format |
| Change Request Allowed? | ⦿ Yes ○ No |
| Contract Type * | IBM Two-way Total Solution Package |
| Document Flow | CSO Two-way TSP Contract Process |
| Customer No. * | 2424242424 |
| BP Customer No. | |
| Attach Document * | E:\eContractDemo\Examples\GFIContractPackage1.pdf  Browse... |
| Document Description | This contract document contains a TL supplement, an addendum and a signature page |
| Attach Document | |
| Document Description | Browse... |
| Contract Value | 500000.00 |
| Currency | USD |
| Country | USA |
| Delivery Type | Physical offline delivery |
| Contract Category | Financing Service |
| Industry Sector | Others |
| Geography | Americas |

About IBM | Privacy | Legal | Contact

| IBM | Home | Products & services | Support & downloads | My Account |
|---|---|---|---|---|

Details of Contract In Process

User Id: thao
Org Name: International Business Machine

Contracts in Process
All Contracts In Process
Create Contract
Search
Contracts OnLine Home
Log Off Make correction to this contract

| | |
|---|---|
| Contract No.: | C12345815 |
| Transaction description: | Term Lease Supplement for Z-Series Servers for Sprint's Data Center |
| Contract comments: | This supplement is part of the TSP package for Sprint's Data Center |
| Version: | 1 |
| Contract Type: | IBM Two-way Total Solution Package |
| Creation Date: | 2003-11-10 |
| Valid Through: | 2004-11-12 |
| Start Date: | 2003-11-20 |
| End Date: | 2004-05-20 |
| Status: | NEW |
| Last Update: | 2003-11-10 |
| RFP/RFQ No.: | R222452 |
| Master Contr No.: | NAD090 |
| Quote Letter No.: | Q12345V2 |
| PO No.: | |
| Customer Ref.: | |
| Contract Value in USD: | 4000000.00 |
| Delivery Type: | Physical offline delivery |
| Contract Category: | Financing Service |
| Industry Sector: | Travel |
| Geography: | Americas |

Contract documents:

1. ContractPackage1.pdf  The Contractpakcage1 document contains a TL supplement and two addenda
Click here to see execution history of this contract Here are the list of actions you can take:
1. ⦿ READY TO SIGN
2. ○ I REJECT ← 84
3. ○ REQUEST FOR CHANGES Please put comments here:

[ no comments allowed ]

( Submit )

| Contracts in Process | Home | Products & services | Support & downloads | My Account |

Contracts in Process
All Contracts In Process
Create Contract
Search
Contracts OnLine Home
Log Off Start Date: 2003-11-10
End Date: 2004-11-10
Status: READY TO SIGN ← 92
Last Update: 2003-10-28
RFP/RFQ No.: R222450
Master Contr No.: NAD090
Quote Letter No.: Q12345V2
PO No.:
Customer Ref.:
Contract Value in USD: 500000.00
Delivery Type: Physical offline delivery
Contract Category: Financing Service
Industry Sector: Others
Geography: Americas    Contract documents:

1. ContractPackage1.pdf This document contains a TL supplement an addendum and a signature page
Click here to see execution history of this contract Please read the Transaction Document above carefully and print and store it for your records. Although the Transaction Document above specifies that you and IBM must sign it, you agree that by clicking on the "I accept" button below, you have read the Transaction Document and agree that the complete agreement between us about this transaction consists of 1) this Transaction Documents, and 2) the Agreement referenced in it, and that such acceptance will be the equivalent of your signature on this Transaction Document. You also agree that you are authorized to execute this Transaction Document for the legal entity on whose behalf you are accepting this Transaction Document. You will receive an online confirmation from IBM when IBM accepts this Transaction Document.
Note that when you click the "I accept" button, IBM is not committing to perform the services described in the Document.
*The IBM Customer Agreement will prevail over any terms and conditions in any purchase order issued by you.*

⟵ 94

1. ⊙ I ACCEPT
User Id *    [ kakan      ]
Password *   [ ************ ]   ← 96

( Submit )

MERGED DOCUMENT SIGNATURE PAGE:

Merged Document
Page 22 of 22

Through the use of Electronic Signatures, as defined in the IBM Global Financing Subscriber Agreement executed by the parties, both parties agree to be bound to the terms of all agreements included in this merged document.

Accepted by:
IBM Credit LLC
For or as Lessor:

By: <u>Electronically signed by</u>
*Authorized Signature*

<u>Thao Nguyen          2003-11-12</u>
Name (Type or Print)    Date

Lessee

By: <u>Electronically signed by</u>
*Authorized Signature*

<u>Nakan Roy          2003-11-12</u>
Name (Type or Print)    Date

State of Origination: _____

FINAL COPY

Signatures / Comments / humbnails / Bookmarks

100 →

METHOD, SYSTEM AND PROGRAM PRODUCT FOR PROTECTING ELECTRONIC CONTRACTS CREATED WITHIN A SECURE COMPUTER INFRASTRUCTURE

CROSS-REFERENCE TO RELATED APPLICATION

This application is related in some aspects to co-pending U.S. application Ser. No. 10/761,551, filed Jan. 21, 2004 and entitled "Method, System and Program Product for Electronically Executing Contracts Within a Secure Computer Infrastructure," which is hereby incorporated by reference.

FIELD OF THE INVENTION

In general, the present invention relates to a method, system and program product for protecting electronic contracts created within a secure computer infrastructure. Specifically, the present invention allows related contracts between multiple parties to be electronically developed, while providing adequate separation and security between the contracts.

BACKGROUND OF THE INVENTION

As use of computer networks becomes more pervasive, there is a growing need to provide for the electronic execution/signature of contracts. Electronic execution of contracts can be both more efficient and cost effective than the traditional paper-based approach. Some specific types of contracts that are amenable to electronic execution are hardware purchase agreements and related service agreements. For example, in purchasing computer hardware, a purchaser may also desire to purchase an associated service agreement. As is well known, these agreements often range over a period of years and can have various pricing schedules. In many instances such contracts might have several different parties. For example, a first contract partner might sell hardware to a second contract partner who will resell the hardware to a customer along with a corresponding service package. Still yet, the first contract partner might sell hardware to a distributor who will resell the hardware to a second contract partner, who will then further resell the hardware and a corresponding service package to the customer.

Unfortunately, many concerns have been raised over electronic contract execution. One such concern is ensuring that electronically executed contracts are legally binding as intended. This can be difficult unless it can be ensured a third party has not fraudulently executed a contract using another party's identity. This concern was addressed by the above-incorporated patent application. However, another concern with such contracts involves avoiding any legal complications such as those raised by the Sherman Antitrust Act. Specifically, with contracts involving multiple parties such as the examples set forth above, the law might require that the contract partner originally selling the hardware, be a different entity than the contract partner selling the service package. Moreover, the law might also require that the contract partner selling the hardware be isolated from the terms and conditions of the service-based contract between the second contract partner and the customer. With the recent evolution of electronic contract execution, providing such isolation/security between the contracts has not been addressed.

In view of the foregoing, there exists a need for a method, system and program product for protecting electronic contracts created within a secure computer infrastructure. Specifically, a need exists for a system that will provide the required legal security between contract partners and their corresponding contracts, while still allowing for the adequate (electronic) development and execution of such contracts

SUMMARY OF THE INVENTION

In general, the present invention provides a method, system and program product for protecting electronic contracts created within a secure computer infrastructure. Specifically, under the present invention, contract information corresponding to a first contract between a first contract partner and a customer, and contract information corresponding to a second contract between a second contract partner and the customer is received within a secure computer infrastructure. Based on the contract information, the first and second contracts are created. To provide desired isolation and security, the second contract is secured to prevent access thereof by the first contract partner. Then, approval and execution for both contracts is requested from the appropriate parties.

A first aspect of the present invention provides a method for protecting electronic contracts created within a secure computer infrastructure, comprising: receiving a first set of contract information for a first contract between a first contract partner and a customer within the secure computer infrastructure; receiving a second set of contract information for a second contract between a second contract partner and the customer within the secure computer infrastructure; electronically creating, within the secure computer infrastructure, the first contract based on the first set of contract information and the second contract based on the second set of contract information; securing the second contract to prevent access by the first contract partner; and requesting approval determinations for the first contract and the second contract by the customer.

A second aspect of the present invention provides a system for protecting electronic contracts created within a secure computer infrastructure, comprising: a contract information collection system for receiving a first set of contract information for a first contract between a first contract partner and a customer within the secure computer infrastructure, and a second set of contract information for a second contract between a second contract partner and the customer within the secure computer infrastructure; a contract creation system for electronically creating, within the secure computer infrastructure, the first contract based on the first set of contract information and the second contract based on the second set of contract information; a security system for securing the second contract to prevent access by the first contract partner; and a contract approval system for requesting and receiving approval determinations for the first contract and the second contract by the customer.

A third aspect of the present invention provides a program product stored on a recordable medium for protecting electronic contracts created within a secure computer infrastructure, which when executed comprises: program code for receiving a first set of contract information for a first contract between a first contract partner and a customer within the secure computer infrastructure, and a second set of contract information for a second contract between a second contract partner and the customer within the secure computer infrastructure; program code for electronically creating, within the secure computer infrastructure, the first contract based on the first set of contract information and the second contract based on the second set of contract information; program code for securing the second contract to prevent access by the first contract partner; and program code for requesting and receiving approval determinations for the first contract and the second contract by the customer.

A fourth aspect of the present invention provides a system for deploying an electronic contract application, comprising: a secure computer infrastructure being operable to: receive a first set of contract information for a first contract between a first contract partner and a customer, and a second set of contract information for a second contract between a second contract partner and the customer; electronically create the first contract based on the first set of contract information and the second contract based on the second set of contract information; secure the second contract to prevent access by the first contract partner; and request and receive approval determinations for the first contract and the second contract by the customer.

Therefore, the present invention provides a method, system and program product for protecting electronic contracts created within a secure computer infrastructure.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a more detailed diagram of the contract system of FIG. 3.

FIG. 5 depicts an illustrative interface page for inputting contract information.

FIG. 7 depicts an illustrative interface page for approving a contract according to the present invention.

FIG. 8 depicts an illustrative interface page for executing a contract according to the present invention.

FIG. 9 depicts an illustrative final image of a contract according to the present invention.

Figure 1:
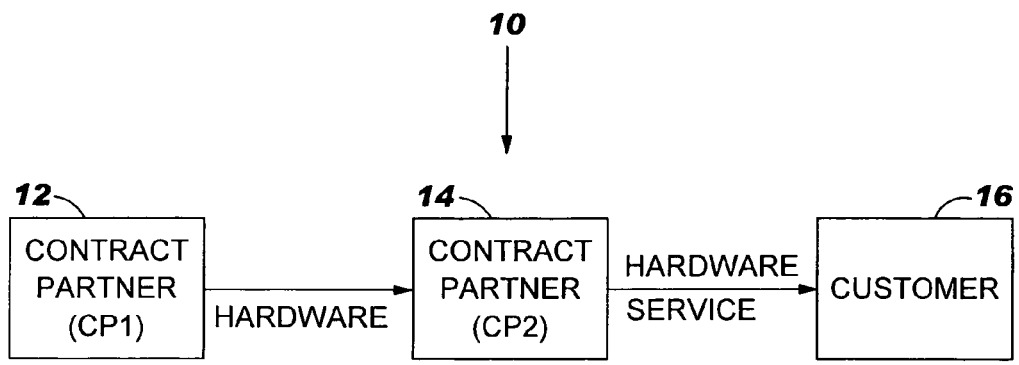
FIG. 1 depicts a first illustrative contract scenario according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
II. Computerized Implementation
III. Detailed Examples I. General Description As indicated above, the present invention provides a method, system and program product for protecting electronic contracts created within a secure computer infrastructure. Specifically, under the present invention, contract information corresponding to a first contract between a first contract partner and a customer, and contract information corresponding to a second contract between a second contract partner and the customer is received within a secure computer infrastructure. Based on the contract information, the first and second contracts are created. To provide desired isolation and security, the second contract is secured to prevent access thereof by the first contract partner. Then, approval and execution for both contracts is requested from the appropriate parties.

As used herein, the term "contract" is intended to refer to any legally binding agreement, such as an agreement for the purchase of goods (e.g., computer hardware), a service agreement, etc. To this extent, the term contract includes, but is not limited to, agreements that have been negotiated between the parties where one party is performing a service and/or delivering hardware. Moreover, for illustrative purposes, the term "goods" will be discussed with respect to computer hardware, while the term "service" will be discussed herein with respect to corresponding service for the computer hardware. However, it should be appreciated that the teachings described herein could be used in conjunction with any type of goods and/or services.

Figure 2:
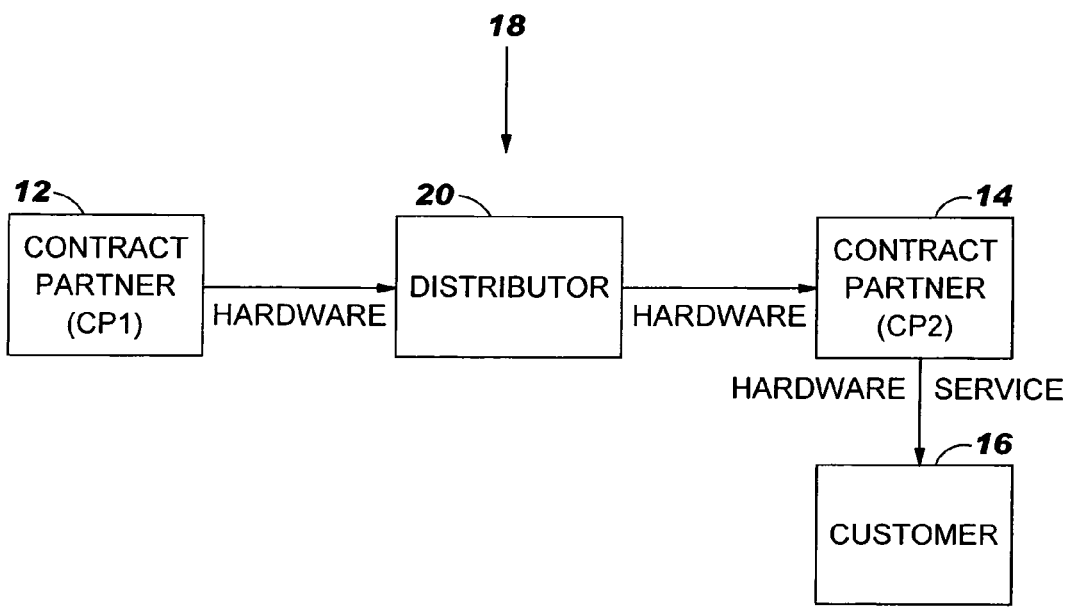
FIG. 2 depicts a second illustrative contract scenario according to the present invention.

Referring to FIG. 1, a first illustrative contract scenario 10 is depicted. Under scenario 10, at least three parties are involved, namely, a first contract partner 12 (CP1), a second contract partner 14 (CP2) and customer 16. In this illustrative scenario 10, CP1 will sell goods such as computer hardware to CP2, who will resell the hardware along with corresponding service to customer 16. As such, for illustrative purposes, CP1 can be viewed as a hardware provider, while CP2 could be viewed as a service provider. In any event, there will typically be at least two contracts involving customer 16 for illustrative scenario 10. Specifically, a first contract for the hardware will be created between customer 16 and CP1, while a second contract for the service will be created between customer 16 and CP2. As indicated above, however, it might be the case that to avoid legal complications, CP1 might have to be isolated from the service contract (and its underlying terms) between CP2 and customer 16. As will be further discussed below, this potential need is addressed by present invention FIG. 2 shows a more complex illustrative scenario 18. Under scenario 18, CP1 provides hardware to a distributor 20, who provides the hardware to CP2, who then provides the hardware along with corresponding service to customer 16. Similar to scenario 10 of FIG. 1, at least two contracts involving customer 16 will be created. Specifically, a hardware contract between CP1 and customer 16 will be created, as well as a service contract between CP2 and customer 16. As with illustrative scenario 10 of FIG. 1, the present invention provides any desired isolation of CP1 from the service contract between CP2 and customer 16.

II. Computerized Implementation

Figure 3:
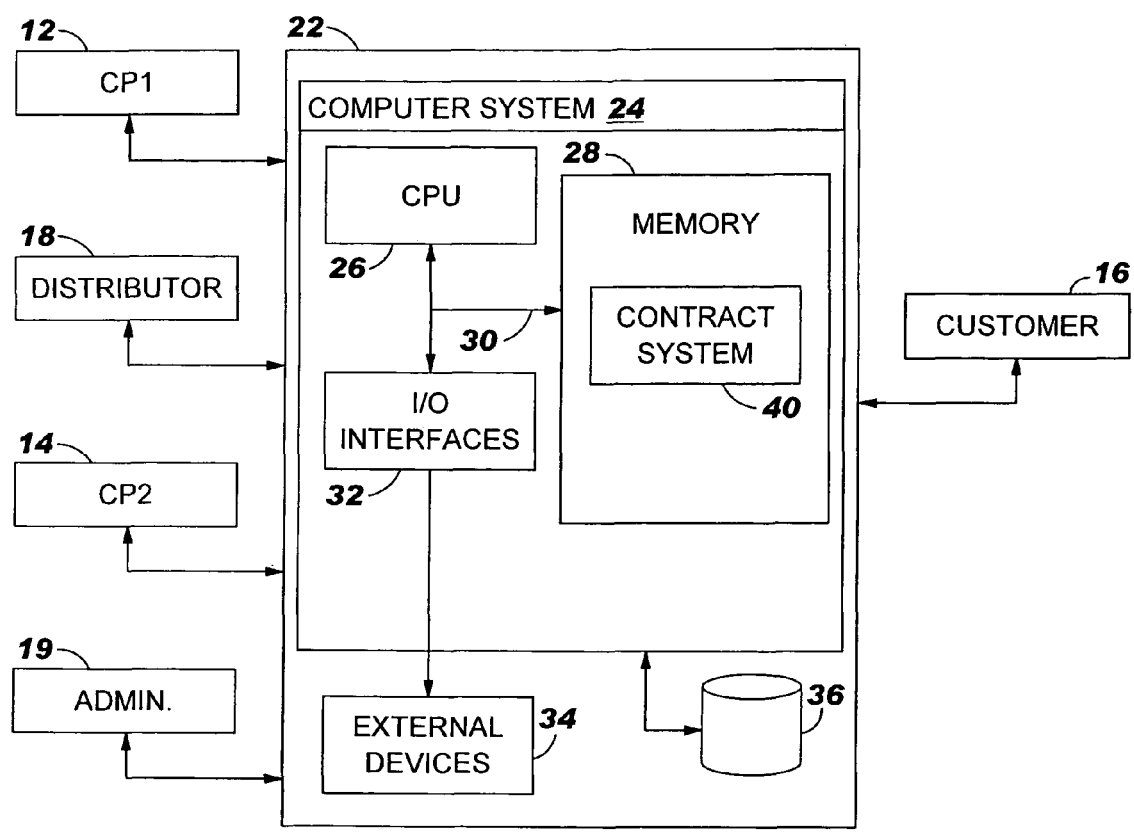
FIG. 3 depicts a more detailed diagram of the contract scenario of FIG. 1.

Referring now to FIG. 3, a system for protecting electronic contracts created within a secure computer infrastructure (infrastructure) 22 is shown. Infrastructure 22 is intended to represent any type of computer architecture that is maintained in a secure environment (i.e., for which access control is enforced). As shown, infrastructure 22 includes computer system 24 that typically represents a server or the like. It should be understood, however, that although not shown, other hardware and software components (e.g., additional computer systems, routers, firewalls, etc.) could be included in infrastructure 22.

In general, CP1, CP2, customer 16 and distributor 18 (collectively referred to as the parties) will interface with infrastructure 22 to create/modify, approve and electronically execute customized contracts. To this extent, the parties could access infrastructure 22 directly, or over a network via interfaces (e.g., web browsers) loaded on computerized devices (e.g., personal computers, laptops, handheld devices, etc. not shown in FIG. 1). In the case of the latter, the network can be any type of network such as the Internet, a local area network (LAN), a wide area network (WAN), a virtual private network (VPN), etc. In any event, communication with infrastructure 22 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 22.

It should be understood that under the present invention, infrastructure 22 could be owned and/or operated by a party such as CP1, or by an independent entity. Regardless, use of infrastructure 22 and the teachings described herein could be offered to the parties on a subscription or fee-basis. In either scenario, an administrator 19 could support and configure infrastructure 22.

Regardless, as further shown, computer system 24 generally comprises central processing unit (CPU) 26, memory 28, bus 30, input/output (I/O) interfaces 32, external devices/resources 34 and storage unit 36. CPU 36 may comprise a single processing unit, or be distributed across one or more processing units in one or more locations, e.g., on a client and computer system. Memory 28 may comprise any known type of data storage and/or transmission media, including magnetic media, optical media, random access memory (RAM), read-only memory (ROM), a data cache, etc. Moreover, similar to CPU 26, memory 28 may reside at a single physical location, comprising one or more types of data storage, or be distributed across a plurality of physical systems in various forms.

I/O interfaces 32 may comprise any system for exchanging information to/from an external source. External devices/resources 34 may comprise any known type of external device, including speakers, a CRT, LCD screen, handheld device, keyboard, mouse, voice recognition system, speech output system, printer, monitor/display, facsimile, pager, etc. Bus 30 provides a communication link between each of the components in computer system 24 and likewise may comprise any known type of transmission link, including electrical, optical, wireless, etc.

Storage unit 36 can be any system (e.g., database, a document web server, etc.) capable of providing storage for information under the present invention. Such information could include, for example, contracts, activity histories, etc. As such, storage unit 36 could include one or more storage devices, such as a magnetic disk drive or an optical disk drive. In another embodiment, storage unit 36 includes data distributed across, for example, a local area network (LAN), wide area network (WAN) or a storage area network (SAN) (not shown). Although not shown, additional components, such as cache memory, communication systems, system software, etc., may be incorporated into computer system 24. In addition, it should also be appreciated that although not shown, any computerized devices operated by the parties would likely include computerized components similar to computer system 24.

Shown in memory 28 of computer system 24 is contract system 40. Under the present invention, contract system 40 allows for the customized creation, approval and electronic execution of related contracts between multiple parties within infrastructure 22. Moreover, contract system 40 allows the contracts to be secured to prevent access by one or more other parties. Specifically, as will be further described below, contract system 40 provides several key protocols/advantages not previously recognized. For example, under the present invention: (1) security to infrastructure 22 is maintained (e.g., typically through 128 bit encryption); (2) confidentiality is maintained so that only appropriate parties can view data and contracts; (3) data integrity is maintained so that corruption does not occur; (4) data retention is provided so that the parties can later view the contract and its surrounding activity; (5) authentication is required so that only authorized parties can access the infrastructure 22 and pertinent contracts; (6) non-repudiation is provided by ensuring that the party executing the contract is the actual party and not a fraudulent user; and (7) data access is provided so that appropriate parties can view data relating to the contract process.

Referring now to FIG. 4, contract system 40 is shown in greater detail. As depicted, contract system 40 includes registration system 42, authentication system 44, negotiation system 45, security system 46, activity tracking system 48, contract information collection system 49, contract creation system 50, contract approval system 52, contract execution system 54 and image system 56. Each of these systems represents program code that performs the function described below. In performing these function, the systems within contract system 40 will likely generate any necessary interface pages and/or notifications that are used to electronically generate, approve and execute a contract under the present invention.

The functions of each of these systems will be further described below, but in general, registration system 42 will be used to first register the parties. In the case where infrastructure 22 is owned/operated by CP1, only registration of CP2, customer 16 and/or distributor 18 might be necessary. In general, registration of a party entails obtaining profile information such as contact information, credit history, etc. Registration is also used so that parties can be later authenticated when attempting to access infrastructure 22. In addition, once profile information is obtained, registration system 42 can communicate with other external systems (not shown) to perform a credit check or the like on a registering party. Authentication system 44 ensures that only authorized parties can access infrastructure 22. Typically this is done based on login information such as a user name and password. Negotiation system 45 provides interface pages for parties to negotiate the terms of their contracts within infrastructure 22. Security system 46 provides security for infrastructure 12 against hackers and the like. This is typically accomplished using 128 bit encryption or other similar method. Under the present invention, security system 46 also provides for separation and security of contracts within infrastructure 22. As indicated above, a contract scenario involving the parties shown in FIG. 4 might involve multiple contracts. In such a case, security system 46 will ensure, for example, that CP1 cannot access a contract between CP2 and customer 16.

Activity tracking system 48 is used to track all activity occurring within infrastructure 22 (e.g., based on date and time as well as an IP address of the users performing the actions). For example, when a contract is created, an entry will be made in storage unit 36 or the like. Similarly, as parties approve and execute the contracts, entries will be made in storage unit 36. This allows a complete history of activity to be easily viewed. Contract information collection system 49 provides interface pages for collecting contract information for the creation of contracts. Contract creation system 50 will create the customized contracts between the parties based on the needs thereof. Contract approval system 52 will coordinate the approval of the contract by the corresponding parties. Once the contract is approved, contract execution system 54 will coordinate the execution of the contracts the parties. After the contract is executed, image system 56 can generate a final image of the contracts for the parties.

The functions of the present invention will be further described below in the context of illustrative scenario 10 of FIG. 1. As such, the involvement of distributor 18 will not be discussed in this section of this application. However, detailed examples that involve distributor 18 will be discussed in Section III below. For the remainder of this section, assume as an illustrative example that infrastructure 22 is owned/operated by CP1 (although this need not be the case). In this case, CP2 and customer 16 will first be registered as described above. As part of the registration process, an electronic notification (e.g., an e-mail) will be communicated to CP2 and customer 16. The electronic notification will likely include a link such as a URL, which upon selection by CP2 and customer 16, will provide initial access to infrastructure 22. Once this initial access is provided, authentication system 44 will provide CP2 and customer 16 with user names and passwords (which can be changed by CP2 and customer 16) for subsequent access of infrastructure 22.

After CP2 and customer 16 have been registered, communication between the parties will occur to determine the corresponding sets of contract requirements/information. For example, the contract between CP1 and customer 16 might be for certain types of hardware at certain quantities and prices. Similarly, the contract between CP2 and customer might be to provide service for the hardware for a certain length, and for a certain price. These sets of contract information can be collected manually by CP1 and/or CP2 (or a representative thereof), electronically via e-mail or the like, or using negotiation system 45. For example, negotiation system 45 can provide interface pages for CP1 and/or CP2 to communicate with customer 16 to determine the precise terms of the contracts. In a typical embodiment, the terms for both contracts will be negotiated by CP1, however, this need not be the case. If CP1 negotiates the terms for the hardware contract and CP2 negotiates the terms for the service contract, the present invention will provide proper isolation and security therefor to ensure that CP1 will not be able to access the terms of the service contract negotiated by CP2. In any event, the contract information can be populated into one or more interface pages 60 provided by contract information collection system 49 (such as that shown in FIG. 5). In a typical embodiment, for this illustrative scenario, both contracts will be created by CP2. Thus, for example, CP2 can input the first set of contract information for the hardware contract between CP1 and customer 16 using a first instance of interface page 60, and input the second set of contract information for the service contract between CP2 and customer 16 using a second instance of interface page 60. From the information contained within the interface pages 60, the new contracts can be customized. Specifically, using the contract information in interface pages 60, contract creation system 50 (FIG. 2) will generate the corresponding contracts. Because the contract is based on the individual needs of the parties, it is considered to be a customized contract, as opposed to a boilerplate agreement such as a "click and accept" agreement. It should be understood, however, that the contracts could actually be created outside of infrastructure 22 (e.g., manually by CP2). As such, contract creation system 50 might simply receive the contracts.

Under the present invention, to provide any needed isolation between CP1 and the service contract, CP2 can utilize security system 46 to secure the service contract. In a typical embodiment, several options are possible. For example, CP2 can encrypt the service contract with a key that is only made available to CP2 and customer 16. Alternatively, CP2 can store the service contract in a document web server such similar to storage unit 36. In such a case, the document web server could be maintained and controlled by CP2 so that access is limited. It should be understood that these options are not intended to be exhaustive and other known security methods could be implemented for securing the service contract. Moreover, to the extent negotiation system 45 is used to develop the terms of the contracts, security system 46 can also provide any needed security and isolation for the negotiations.

In any event, once the contracts have been created, activity tracking system 48 (FIG. 2) will log the generation of the contracts based on date and time in storage unit 36 and the contracts can be assigned an initial status of "Submitted" (e.g., by contract creation system 50). At this point, the contracts can undergo an internal review process by CP1 and/or CP2. This might especially be the case when CP2 creates the hardware contract. In such a case, an internal review by personnel within CP1 can be performed to ensure correctness of the terms. In any event, once the internal review process is complete, the contracts can be changed to "New." It should be recognized that a single party could have contracts pending with multiple different parties. For example, CP1 could be contracting with several different customers. To this extent, each party could have its own "room" within infrastructure 22 that contains all of its pending contracts. Only that party could have permission to access its room. This model could be extended to individuals or departments within a single organization. For example, each department could have its own room that cannot be accessed by other departments.

Figure 6:
FIG. 6 depicts an illustrative approval notice according to the present invention.

Regardless, once the contracts have been generated, contract approval system 52 (FIG. 4) will generate and send one or more electronic approval notifications (e.g., e-mail) to customer 16. FIG. 6 depicts an illustrative approval notification 70 for customer 16. As depicted, approval notification 70 includes a link 72. Upon selection of link 72, customer 16 will be brought to a login page to log into infrastructure 22. Such a log-in page will prompt customer 16 for login information such as a user name and password. Upon being submitted, authentication system 44 will attempt to authenticate the information. If successful, contract approval system 52 (FIG. 4) will display an interface page for customer 16 to approve the contracts. To this extent, link 72 can be considered to be a "smart link" that sends customer 16 directly to the contract to be approved once authentication is successful. However, to access the service contract, customer 16 might be required to input another password and/or an encryption key.

Referring to FIG. 7, an illustrative approval interface page 80 is shown. Customer 16 could be presented with a separate instance of interface page 80 for each contract. As depicted, interface page 80 not only includes biographical information 82 about the corresponding contract and activity related thereto, but also a mechanism 84 for customer 16 to input comments and make an approval determination. As shown, an approval determination can include a decision to approve, deny (e.g., seek changes) or have the contract withdrawn completely. In approving the contract, it should be understood that one or more individuals within customer 16 could be required to act in this manner.

Once customer 16 approves the contracts, the statuses thereof will be changed to "Ready to Sign" by contract approval system 52 (FIG. 4) as demonstrated in interface page. It should be appreciated that CP1 and CP2 could also approve the contracts in a similar manner. This could especially be the case for CP1 if CP2 prepared the hardware contract. In this case, approval by CP1 could occur prior to approval by customer 16. Moreover, if customer 16 requested any changes to the contracts, CP2 can modify the contracts accordingly. If changes to the hardware contract are requested, such requests can be communicated to CP1 for approval before the hardware contract is actually modified. However, if customer 16 approved the contracts, execution thereof can occur immediately. In any event, all versions of the contract as well as the surrounding activities will be maintained by the system.

In a typical embodiment, if customer 16 indicates the contract is "Ready to Sign," any comments input by customer 16 can be blocked out. This helps prevent subsequent repudiation or dispute. At this point contract execution system 54 (FIG. 4) can begin the process of having the parties execute the contracts. In typical embodiment, customer 16 will be solicited for execution first (although this need not be the case). To obtain execution of the contracts, electronic execution notifications similar to electronic approval notification 70 of FIG. 6 can be communicated. Upon receipt, customer 16 can select the link and login once again.

Similar to the approval process, customer 16's login information will first be authenticated. Thereafter, as shown in FIG. 8, customer 16 will be presented with instances of interface page 90 for executing the contracts. As depicted, interface pages 90 includes biographical information 92 and mechanism 96 to accept/execute the contract. Interface page 90 can also include a legal notice 94 or the like.

Once customer 16 executes the contracts, contract execution system 54 (FIG. 4) will change the statuses thereof to "Signed." Then, execution by CP1 of the hardware contract and execution by CP2 of the service contract can be solicited in a similar manner. Specifically, an electronic execution notification communicated to each party. Similar to the approval notification, the execution notifications can include a (smart) link to a login page. The login information for CP1 and CP2 will be authenticated, and each can be presented with an interface page similar to interface page 90 of FIG. 8 to execute their respective contracts. It should be noted that execution interface pages 90 can include another prompt for the parties to input their login information. This provides yet another opportunity to authenticate each party and ensure that the individual making the selections is in fact authorized to do so. In any event, once CP1 and CP2 have executed their respective contracts, the statuses thereof will be changed by contract execution system 54 (FIG. 4) to "Countersigned."

At this point, CP1 and/or CP2 can be prompted by image system 56 (FIG. 4) via notification or the like to have final images of the contracts generated. For example, assume that CP2 is prompted to have the final images of both contracts generated. In this case, CP2 can log in and be authenticated. Thereafter, interface pages can be accessed that includes biographical information, as well as a mechanism to add the electronic signatures to the respective contracts. Once this is done, a final image of the contract is generated. Referring to FIG. 9, an illustrative final image 100 of one of the contracts shown. As depicted, final image 100 includes the electronic signatures of CP1 and customer 16 as well the corresponding date stamps of execution. At this point, the statuses of the contract will be changed to "Complete."

Figure 10:
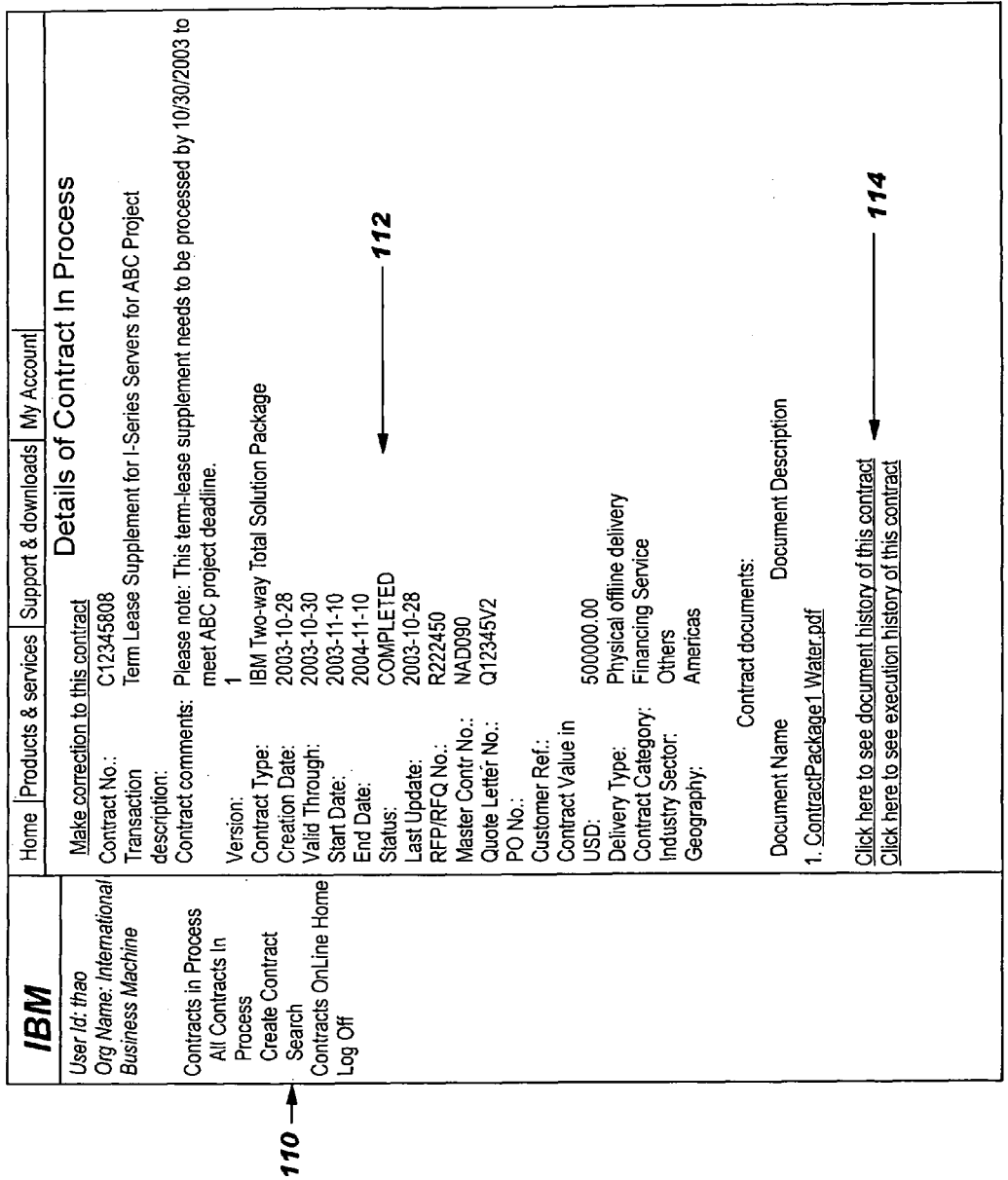
FIG. 10 depicts an illustrative interface page for viewing contract details according to the present invention.

Because activity tracking system 48 (FIG. 4) recorded all activity surrounding the contract, either party can log into the system to view the details. For example, referring to FIG. 10, an illustrative interface page 110 for viewing the contract details of one of the contracts is shown. Interface page 110 not only sets forth some biographical information 112, but also has a mechanism 114 for a party to view a document history of the contract, or an execution history of the contract. As indicated above, activity tracking system 48 could also track the IP addresses of the parties as the actions are performed. This also helps prevent repudiation by either party, Because the present invention incorporates various safeguards, repudiation of the contract by either party is extremely difficult. For example, not only do approval and execution of the contract require separate deliberate actions by both parties, but authentication is also provided at all phases of the process, including twice for execution. Moreover, the present invention provides an opportunity for appropriate legal notices to be provided.

It should be understood that interface pages discussed herein are not intended to be limiting or exhaustive, rather they are only a sampling of illustrative pages that could be implemented under the present invention. A more detailed sampling of interface pages is shown and described in the above-incorporated patent application. It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

III. DETAILED EXAMPLES

In this section, three detailed examples for carrying out the present invention will be discussed.

Example 1

In this example, assume that the parties involved are those discussed in conjunction with scenario 10 of FIG. 1, namely, CP1, CP2 and customer 16. Under this example, CP2 will negotiate the basic terms of the proposal with customer 16, and thereafter develop the proposals into the hardware contract and the service contract (the latter of which is secure from access by CP1). As discussed above, security for the service contract can occur many any known means such as encryption, storage on a document web server, etc. The customer can then log in and make an approval determination for each contract. If customer 16 approves the contracts, customer 16 can then also execute the contracts and appropriate notifications can be sent to CP1 and CP2. However, if changes are requested for either contract, such requests will be routed to CP2. If the changes pertain to the hardware contract, such changes can be communicated to CP1 for approval, denial, request for clarification, etc. However, once customer 16 has approved and executed the contracts, CP1 and CP2 will execute their respective contracts. Thereafter, a final image of the contracts can be generated and routed to the appropriate parties.

Example 2

In this example, assume that the parties involved include CP1, distributor 18, CP2 and customer 16 (as shown in FIG. 2). In this example, distributor 18 acts as an intermediary or quazi-proxy on behalf of CP1. Specifically, in this example, CP2 will negotiate the basic terms of the proposal with customer 16 and thereafter notify distributor 18 of the deal. Distributor 18 will then create the hardware contract in a manner similar to which CP2 created it in Example I above. Specifically, distributor 18 will input the contract information and create the contract within infrastructure 22. CP2 will create the service contract and secure the same from distributor 18 and CP1 as discussed above. Thereafter, customer 16 can log on for the approval process. If the contracts are approved "as is," customer 16 can immediately execute the contracts. However, any changes requested to the hardware contract can be routed back to distributor 18 who will communicate the same to CP1. If changes are made to the hardware contract, such changes could be made by either CP1 or distributor 18. Any changes requested to the service contract will be routed to CP2, who can then make those changes if desired. Once the contracts are repackaged, the approval process can continue, after which the contracts can be executed. Distributor 18 can then notify CP1 of the completed deal, and CP2 and distributor 18 can have the final images of their respective contracts generated.

Example 3

In this example, assume that the parties involved include CP1, distributor 18, CP2 and customer 16 (as shown in FIG. 2). In this example, CP2 will negotiate the basic terms of the proposal with customer 16 and thereafter create both contracts (and secure the service contract from access by CP1 or distributor 18) in a manner similar to Example 1. Thereafter, customer 16 can log on for the approval process. If the contracts are approved "as is," customer 16 can immediately execute the contracts. However, any changes requested to the hardware contract can be routed back to distributor 18 who will communicate the same to CP1. Any feedback from CP1 will be routed to distributor 18 and then to CP2. CP2 can then make any changes agreed upon by CP1 to the hardware contract, as well as any changes CP2 agrees upon to the service contract. Once the contracts are repackaged, the approval process can continue, after which the contracts can be executed. Distributor 18 can then notify CP1 of the completed deal. Thereafter, the final images of the contract can be requested by CP2.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the depiction of contract system 40 is intended to be illustrative only. That is, contract system 40 could be represented by a different configuration of systems. For example, the status of the contract could be changed by a "status system" (not shown) in contract system 40 instead of by the individual systems as described above. Moreover, although certain terminology has been used herein to indicate the various status's of the contract, it should be understood that other versions of terminology could be utilized. Still yet, although 128 bit encryption is indicated as the typical method of encryption, any other type of encryption could be implemented to provide security for the system.

We claim:

1. A method for protecting electronic contracts created within a secure computer infrastructure, comprising:
   receiving a first set of contract information for a first contract between a first contract partner and a customer within the secure computer infrastructure;
   receiving a second set of contract information, distinct from the first set of contract information, for a second contract between a second contract partner, distinct from the first contract partner, and the customer within the secure computer infrastructure, the first and second contracts being related to a single business transaction for the customer involving the first contract partner and the second contract partner such that performance by the second contract partner under the second contract requires a previous performance by the first contract partner under the first contract, wherein the first set of contract information and the second set of contract information are provided by the second contract partner;
   electronically creating, within the secure computer infrastructure, the first contract based on the first set of contract information and the second contract based on the second set of contract information;
   securing the second contract to prevent electronic access by the first contract partner to the second contract within the secure computer infrastructure;
   requesting approval determinations for the first contract and the second contract by the customer; and
   tracking all activity information for the first contract and all activity information for the second contract, wherein activity information includes a date and a time of an activity and an IP address of a user performing the activity.

2. The method of claim 1, wherein the second contract partner is not a party to the first contract, and wherein any changes to the first contract or the second contract requested by the customer are coordinated by the second contract partner.

3. The method of claim 1, further comprising requesting execution of the first contract and the second contract after approval by the customer.

4. The method of claim 1, wherein changes to the first contract requested by the customer are communicated from a distributor to the first contract partner.

5. The method of claim 1, wherein the first contract relates to the purchase of goods and the second contract relates to the purchase of services related to the goods.

6. The method of claim 5, wherein the second contract partner is a service provider, and wherein the first contract partner operates the secure computer infrastructure.

7. The method of claim 1, wherein the securing step comprises encrypting the second contract.

8. The method of claim 1, wherein the securing step comprises storing the second contract in a secured storage system.

9. The method of claim 1, further comprising providing the customer with electronic access to the first contract and the second contract within the secured computer infrastructure.

10. A system for protecting electronic contracts created within a secure computer infrastructure, comprising:

a contract information collection system for receiving a first set of contract information for a first contract between a first contract partner and a customer within the secure computer infrastructure, and a second set of contract information, distinct from the first set of contract information, for a second contract between a second contract partner, distinct from the first contract partner, and the customer within the secure computer infrastructure, the first and second contracts being related to a single business transaction for the customer involving the first contract partner and the second contract partner such that performance by the second contract partner under the second contract requires a previous performance by the first contract partner under the first contract, wherein the first set of contract information and the second set of contract information are provided by the second contract partner via at least one interface page;

a contract creation system for electronically creating, within the secure computer infrastructure, the first contract based on the first set of contract information and the second contract based on the second set of contract information;

a security system for securing the second contract to prevent electronic access by the first contract partner to the second contract within the secure computer infrastructure;

a contract approval system for requesting and receiving approval determinations for the first contract and the second contract by the customer; and an action tracking system for tracking all activity information for the first contract and all activity information for the second contract, wherein activity information includes a date and a time of an activity and an IP address of a user performing the activity.

11. The system of claim 10, further comprising a contract execution system for requesting and receiving execution determinations for the first contract and the second contract after the approval by the customer.

12. The system of claim 10, further comprising an image system for generating a final image of the first contract and the second contract within the secure computer infrastructure after the execution is complete.

13. The system of claim 10, wherein any changes to the first contract or the second contract requested by the customer are coordinated by the second contract partner.

14. The system of claim 10, wherein changes to the first contract requested by the customer are communicated from a distributor to the first contract partner.

15. The system of claim 10, wherein the first contract relates to the purchase of goods and the second contract relates to the purchase of services related to the goods.

16. The system of claim 15, wherein the second contract partner is a service provider.

17. The system of claim 10, wherein the security system encrypts the second contract.

18. The system of claim 10, wherein the security system stores the second contract in a secured storage system.

19. The system of claim 10, wherein access to the secure computer infrastructure is controlled.

20. A program product stored on a recordable storage medium for protecting electronic contracts created within a secure computer infrastructure, which when executed comprises:

program code for receiving a first set of contract information for a first contract between a first contract partner and a customer within the secure computer infrastructure, and a second set of contract information, distinct from the first set of contract information, for a second contract between a second contract partner, distinct from the first contract partner, and the customer within the secure computer infrastructure, the first and second contracts being related to a single business transaction for the customer involving the first contract partner and the second contract partner such that performance by the second contract partner under the second contract requires a previous performance by the first contract partner under the first contract, wherein the first set of contract information and the second set of contract information are provided by the second contract partner via at least one interface page;

program code for electronically creating, within the secure computer infrastructure, the first contract based on the first set of contract information and the second contract based on the second set of contract information;

program code for securing the second contract to prevent electronic access by the first contract partner to the second contract within the secure computer infrastructure;

program code for requesting and receiving approval determinations for the first contract and the second contract by the customer; and program code for tracking all activity information for the first contract and all activity information for the second contract, wherein activity information includes a date and a time of an activity and an IP address of a user performing the activity.

21. The program product of claim 20, further comprising program code for requesting and receiving execution determinations for the first contract and the second contract after the approval by the customer.

22. The program product of claim 20, further comprising program code for generating a final image of the first contract and the second contract within the secure computer infrastructure after the execution is complete.

23. The program product of claim 20, wherein any changes to the first contract or the second contract requested by the customer are coordinated by the second contract partner.

24. The program product of claim 20, wherein changes to the first contract requested by the customer are communicated from a distributor to the first contract partner.

25. The program product of claim 20, wherein the first contract relates to the purchase of goods and the second contract relates to the purchase of services related to the goods.

26. The program product of claim 25, wherein the second contract partner is a service provider.

27. The program product of claim 20, wherein the program code for securing encrypts the second contract.

28. The program product of claim 20, wherein the program code for securing stores the second contract in a secured storage system.

29. The program product of claim 20, wherein access to the secure computer infrastructure is controlled.

30. A system for deploying an electronic contract application, comprising:

a secure computer infrastructure being operable to:
receive a first set of contract information for a first contract between a first contract partner and a customer, and a second set of contract information, distinct from the first set of contract information, for a second contract between a second contract partner, distinct from the first contract partner, and the customer, the first and second contracts being related to a single business transaction for the customer involving the first contract partner and the second contract partner such that performance by the second contract partner under the second contract requires a previous performance by the first contract partner under the first contract, wherein the first set of contract information and the second set of contract information are provided by the second contract partner;

electronically create the first contract based on the first set of contract information and the second contract based on the second set of contract information;

secure the second contract to prevent electronic access by the first contract partner to the second contract within the secure computer infrastructure;

request and receive approval determinations for the first contract and the second contract by the customer; and track all activity information for the first contract and all activity information for the second contract, wherein activity information includes a date and a time of an activity and an IP address of a user performing the activity.

31. The system of claim 30, wherein any changes to the first contract or the second contract requested by the customer are coordinated by the second contract partner.

32. The system of claim 30, wherein the secure computer infrastructure is further operable to request execution of the first contract and the second contract after approval by the customer.

33. The system of claim 30, wherein changes to the first contract requested by the customer are communicated from a distributor to the first contract partner.

34. The system of claim 30, wherein the first contract relates to the purchase of goods and the second contract relates to the purchase of services related to the goods.

35. The system of claim 34, wherein the second contract partner is a service provider.

36. The system of claim 30, wherein the secure computer infrastructure is operable to encrypt the second contract to prevent access by the first contract partner.

37. The system of claim 30, wherein the secure computer infrastructure is operable to store the second contract in a secured storage system to prevent access by the first contract partner.

38. The system of claim 30, wherein the secure computer infrastructure is further operable to provide the customer with access to the first contract and the second contract.

* * * * *